Patented July 23, 1940

2,208,974

UNITED STATES PATENT OFFICE 2,208,974

PROCESS FOR THE REFINING OF SILICON ALLOYS

Ture Robert Haglund, Stockholm, Sweden

No Drawing. Application September 20, 1937, Serial No. 164,814. In Sweden September 29, 1936

5 Claims. (Cl. 75—12)

This invention relates to processes for the refining of silicon alloys.

Silicon alloys generally only contain a comparatively small amount of chemically combined carbon. Even a low carbon content is, however, in many cases undesirable, particularly when the silicon alloy is to be employed for the purpose of utilizing its silicon content as a reducing agent in producing low-carbon alloys, e. g. low-carbon ferro-chrome.

According to present invention the refining of the silicon alloy, by which in this connection are understood alloys having a silicon content at least amounting to 10%, is brought about by decarbonizing the silicon alloy, while being melted or in a molten state, by means of causing it to react with a siliceous material in contact with the alloy, at the same time promoting the reaction by keeping one or both of the reacting materials in motion. The process is preferably brought about by stirring siliceous materials, e. g. pulverized quartz or silicates of an acid nature, into the silicon alloy. According to a modified process, such siliceous materials are made to circulate or move about on the surface of the molten alloy-bath. By the intimate contact between molten alloy and finely divided particles rich in silica, which is caused by the stirring, an oxidation will take place of carbon in the alloy, which reduces the silica present, and escapes as carbon monoxide. In order to promote the reaction, the metallic bath should be heated to a high temperature, preferably at least to such a temperature that also the particles rich in silica, which are being introduced in the metallic bath, will be in a molten state during the reaction. By siliceous materials are, within the scope of the present invention, understood such materials which either contain free silica or silicates of an acid nature. In such cases where the siliceous material is added in the form of free silica, e. g. as pulverized quartz, the temperature employed should thus exceed the melting point of quartz. Instead of quartz it is, however, as mentioned, also possible to employ certain silicates, whereby a regulation of the temperature at which the siliceous material will melt may be effected. In the case of silicates, the basic constituent of which e. g. is oxide of calcium or magnesium, there must always be more than one molecule of silica present per molecule of base. If, on the other hand, mixtures or compounds of silica chiefly containing one or several less basic oxides such as oxides of alumina or titanium are employed, a considerably lower content of silica may be permitted in the mixture or compound.

According to another modification of the invention, the siliceous material needed for the decarburizing may be partly or wholly added by oxidation of part of the silicon contained in the alloy. Such oxidation may be brought about by addition of one or several oxides which are easily reduced by silicon, e. g. oxide of iron, or by means of causing oxidizing gases such as air, oxygen or carbon dioxide to act on the alloy, either upon its surface or by being introduced into the molten metallic bath. It may also be advisable to employ gases in the process in order to lower the partial pressure of the carbon monoxide near the surface of the metallic bath, either by a combustion of the carbon monoxide by means of oxygen or air, or by diluting it with some neutral gas such as hydrogen, nitrogen or carbon dioxide. A more or less strong vacuum may also be employed for this purpose. In certain cases the alloy may also be subjected to a vacuum after the refining, in order to remove undesirable gases contained in the same.

According to still another modification of the invention the decarburizing of the alloy is effected by means of melting it or introducing it in a molten state in a furnace having a lining in contact with the metallic bath, which lining at least partly consists of quartz or a siliceous material of such a nature that it contains silica partly or completely in a free state or combined with an oxide of a neutral or acid nature, such as oxide of alumina, titanic acid, etc., and in which furnace the metallic bath, e. g. by means of induction currents, is brought into motion in relation to the furnace lining. It is of course also possible at the same time to introduce additional siliceous material in above described manner, and to stir this into the metallic bath or to permit it to circulate on the surface of the same. This may also be effected by melting off part of the lining. It has thus, particularly in the case of decarburizing of silicon alloys containing chromium, proven of advantage to carry the heating of the metallic bath, e. g. by means of using an induction furnace of the so called eddy-current type, to such an extent that the surface layer of the lining adjacent to the metallic bath will melt or begin to melt, whereby particles containing silica will detach from the lining and become stirred into the metallic bath owing to the movements of this latter. When decarburizing such alloys of silicon in which the carbon is less firmly combined, e. g. silicon metal and commercial ferro-silicon alloys, it is generally sufficient to work without using such a high degree of superheating that the lining will begin to melt. The siliceous material in the lining may suitably consist of quartz or masses rich in quartz. As an alternative the furnace or crucible may be given an inside coating of a mixture rich in quartz or silica, in which case the rest of the lining, if desired for special reasons, may consist of some other refractory material. In general the lining may be built of bricks of a fire-resisting material rich in silica, or else applied on the inside of the furnace or crucible in the form of a mortar or the like having the desired composition.

According to the invention the metallic bath may be brought into motion by purely mechanical means or by means of a stirring caused by electric influence. A mechanical stirring may be effected using a rotary stirring device, consisting of or covered with a material rich in silica, which, owing to a softening or melting of its surface in contact with the metallic bath, will eject particles rich in silica into this latter. An induction furnace is, however, preferably used for heating and stirring of the metallic bath. A particularly strong stirring effect is obtained by employing electric induction furnaces of the so called eddy-current type. The superheating of the metallic bath, as well as its melting when it is charged in a solid state, is in such cases suitably made while using a less active movement, e. g. employing a high frequency current, whereas the subsequent powerful stirring, which is employed to cause a reaction between metallic bath and silica, is preferably effected by means of low frequency current. The silicon alloy is suitably charged in the induction furnace in a molten state, e. g. from the furnace in which it is produced.

As already mentioned, the present invention is particularly useful for a lowering of the carbon content of silicon alloys of heavy metals having an affinity for carbon which are to be employed in the production of low carbon metals and alloys, e. g. of chromium, manganese, vanadium, etc., utilizing the silicon content as a reduction agent for the metal oxide. The silicon alloy is suitably added in a molten state to the material which is to be reduced. When producing low-carbon chromium and low-carbon chromium alloys, e. g. ferro-chrome, while employing silico-chrome, with or without a content of iron, ferro-silicon or metallic silicon, for the reduction of materials containing chromium oxide, it is thus suitable to subject said silicon alloys to a treatment according to present invention. The same is true of the silicon-manganese alloys generally employed in the production of low carbon ferro-manganese. Such silicon alloys, containing chromium or manganese, are generally produced by a reduction of silica by means of carbon in the presence of an alloy, ore or slag containing manganese or chromium. The higher the proportion of silicon reduced from the silica, compared to the proportion of chromium or manganese, respectively, the lower will generally be the carbon content of the recovered alloy. The cost of production of the silicon alloy will, however, for high contents of silicon, increase much more rapidly than what corresponds to the increase of the silicon content. When using the present invention for a lowering of the carbon content of the silicon alloy it is, however, possible to employ a lower silicon content than would otherwise be required, because of the fact that the present invention makes a satisfactory decarburizing possible, also in cases when the raw-material possesses a comparatively high content of carbon. In the case of alloys with a high content of chromium it is, however, advisable to start with a silico-chrome alloy with at least 20% silicon. When a particularly low carbon content is desirable, the silicon content of the raw-material should exceed one atom of silicon per each atom of heavy metal. As an example, it may be stated that silicon alloys with a carbon content of about 1 per cent of carbon by means of the invention have been refined down to a carbon content below 0.1%.

In addition to decarburizing of these last mentioned silicon alloys, serving as reducing agents, the invention may also be advantageously employed for a lowering of the carbon content of commercially common types of silicon alloys, such as ferro-silicon of various qualities, silicon metal, silicon-manganese, etc., which are employed for other purposes than as reducing agents.

The expressions "lining containing free silica," "lined with silica," and "having a lining of a material of an acid nature containing silica" in the claims, also comprise those cases where the furnace lining is provided with a coating of these materials, irrespective of whether the lining is entirely of this or some other composition.

I claim:

1. The process of refining heavy metal-silicon alloys which comprises decarburizing an alloy containing at least about 10 per cent by weight of silicon and a heavy metal having an affinity for carbon by contacting the same while in molten condition with a material of acid nature containing silica and while heating and keeping the alloy in movement by means of induction currents, the content of silicon in said alloy remaining above about 10 per cent by weight during the decarburizing treatment, whereby the carbon content of said alloy is substantially reduced.

2. A process for decarburizing heavy metal-silicon alloys containing at least about 10 per cent by weight of silicon and a heavy metal having affinity for carbon, with at least one atom of silicon present for each atom of heavy metal, comprising treating a molten bath of the silicon alloy with a material of an acid nature containing silica at a temperature at which reaction takes place between the silica and the carbon of the alloy and stirring the alloy by means of induction currents during the treatment, the conditions of treatment being such that the content of silicon in the alloy corresponds to at least one atom of silicon to each atom of heavy metal throughout the process whereby the carbon of said alloy is substantially reduced.

3. A process for refining heavy metal-silicon alloys containing at least about 10 per cent by weight of silicon, carbon and at least one heavy metal having an affinity for carbon, comprising charging the alloy into an induction furnace having a lining of a material of acid nature containing silica and decarburizing the alloy at least partly by interaction with the lining, heating the alloy with induction currents and imparting to the alloy by means of said currents a movement relative to the lining thereby hastening the reaction between the silica of the lining and the carbon of the alloy, the content of silicon in said alloy being maintained sufficiently high so that substantially all the heavy metal is present in the form of its silicide throughout the process whereby the carbon content of said alloy is substantially reduced.

4. A process for decarburizing ferro-silicon, comprising treating a molten bath of ferro-silicon containing at least about 10 per cent by weight of silicon with a material of an acid nature containing silica at a temperature at which reaction takes place between the silica and the carbon of the ferro-silicon and during the decarburizing treatment keeping the ferro-silicon in movement by means of induction currents, the conditions of treatment being such that the content of silicon is sufficient so that substantially all the iron is present in the form of its silicide throughout the process whereby the carbon in said alloy is substantially reduced.

5. A process for producing chromium-silicon alloys, containing chromium and for each atom of chromium at least one atom of silicon, with a low content of carbon, comprising producing from chromium and silica-containing materials by reduction processes utilizing carbon as a reducing agent, an alloy containing chromium and for each atom of chromium at least one atom of silicon, decarburizing said alloy in molten condition with a silica-containing material while heating and stirring the alloy with induction currents, the content of silicon in said alloy being at least about 10 per cent by weight and remaining above one atom of silicon for each atom of chromium during the decarburizing treatment whereby the carbon content of said alloy is substantially reduced.

TURE ROBERT HAGLUND.